United States Patent [19]

Svensson et al.

[11] Patent Number: 4,478,141
[45] Date of Patent: Oct. 23, 1984

[54] APPARATUS FOR HEAT TREATMENT

[75] Inventors: Sten-Eric Svensson, Ängelholm; Gustaf A. Andersson, Viken, both of Sweden

[73] Assignee: Frigoscandia Contracting AB, Helsingborg, Sweden

[21] Appl. No.: 468,290

[22] Filed: Feb. 22, 1983

[30] Foreign Application Priority Data

Mar. 1, 1982 [SE] Sweden .............................. 8201258

[51] Int. Cl.³ ...................... A23B 7/00; A23N 12/00; F26B 3/00; F26B 21/06
[52] U.S. Cl. ....................................... 99/476; 34/191; 99/474; 99/483; 99/517; 165/108
[58] Field of Search .......... 99/467, 468, 470, 473–476, 99/482, 483, 516, 534, 646 R; 34/10, 155, 57 R, 160, 57 A, 191, 196, 197; 62/426, 427; 165/69, 108

[56] References Cited

FOREIGN PATENT DOCUMENTS 2083443 12/1971 France .
1560545 2/1980 United Kingdom .

Primary Examiner—Timothy F. Simone
Attorney, Agent, or Firm—Shapiro and Shapiro

[57] ABSTRACT

An apparatus for heat treatment of food products, in the form of a product bed consisting of solid particles, includes a container with a perforated bottom for the product bed. Gas is adapted to be supplied to the product bed in the container of this apparatus generally from below upwards through the perforated bottom at such a velocity that the product bed will form a fluidized bed. The gas, which is caused to circulate in the apparatus by means of a fan and to flow through the container as well as through a heat exchanger, is adapted to pulsate through the product bed in the container. According to the invention the apparatus is provided with a conduit passing by the container and being situated before the container with the perforated bottom, as counted in the flow direction, said conduit being provided with a rotatable damper which is adapted during its rotation to raise and lower the pressure under the perforated bottom for the pulsation of the gas through the product bed. The air from the container as well as from the conduit is adapted to pass the heat exchanger and the fan so that the fan can constantly operate at full capacity and the heat exchanger at full power.

8 Claims, 1 Drawing Figure

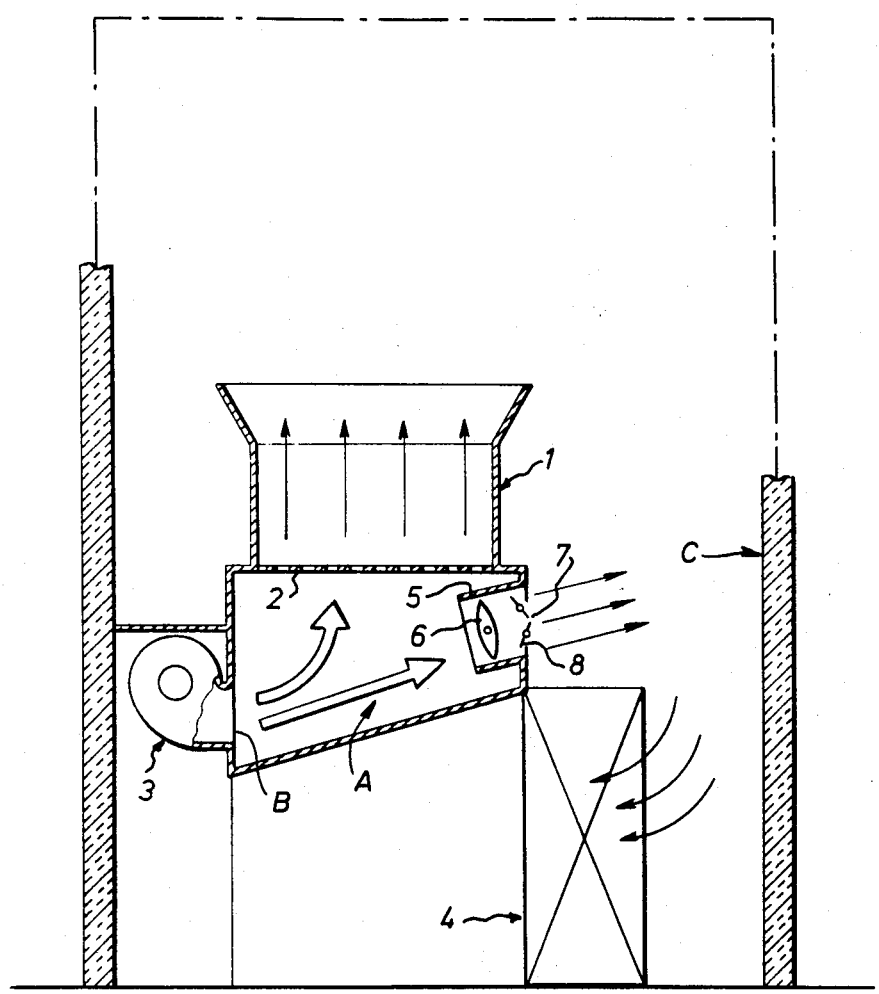

APPARATUS FOR HEAT TREATMENT

The present invention relates to an apparatus for heat treatment, such as freezing, of especially food products in the form of a product bed consisting of solid particles, said apparatus including a container which has a perforated bottom for the product bed and in which gas is adapted to be supplied to the product bed in the container generally from below upwards through the perforated bottom at such a velocity that the product bed will form a fluidized bed, while the gas, which is caused to circulate in the apparatus by means of at least one fan and to flow through the container as well as through a heat exchanger, is adapted to pulsate through the product bed in the container. Characteristic of the invention is that the apparatus is provided with a conduit by the container and being situated before the container with the perforated bottom, as counted in the flow direction, said conduit being provided with a rotatable damper or the like which is adapted during its rotation to raise and lower the pressure under the perforated bottom for the pulsation of the gas through the product bed, the air from the container as well as from the conduit being adapted to pass the heat exchanger and the fan so that the fan can constantly operate at full capacity and the heat exchanger at full power. Thus, the advantage especially gained by this invention is that the fan or fans can all the time operate at full capacity. A total quantity of air will thus pass through the heat exchanger, which gives good heat transmission.

According to an important characteristic feature the apparatus in combination with the rotatable damper is provided with at least one adjustable passage or the like controlling the amount of gas flowing beside the container with the perforated bottom. The amount of gas flowing through the container can thereby be adjusted to the product situated in the container and this will thus take place with maintained full capacity of the fan or fans.

The invention will be described in greater detail below with reference to the accompanying drawing which shows a cross-section of an apparatus for freezing of food products.

The apparatus includes a container 1 with a perforated bottom 2 for a product bed of food products in the form of solid particles. Air or other gas is adapted to be supplied to the product bed, resting on the perforated bottom 2 in the container 1, in a generally upward direction through the perforated bottom 2 at such a velocity that the product bed will form a fluidized bed. At least one fan 3 is adapted to cause the air to circulate in the apparatus and to flow through the container 1 as well as through a heat exchanger 4 consisting of an evaporator 4.

Some products are particularly difficult to fluidize due to their shape. Such products are e.g. beans, cauliflower and carrot cubes. The problem is that such products are apt to pile, which makes it difficult to level out pockets arising in the product bed. In other words, there will arise craters through which the cold air passes. The product lying beside the craters will freeze up into lumps, whereby the fluidization will be interrupted. These craters are avoided by making the air pulsate through the product bed. According to the invention a duct A is provided beneath the perforated bottom 2 of container 1. The duct has an inlet B through which gas is supplied to the duct by fan 3 and has a pair of outlets, one of which is constituted by perforated wall 2 and the other of which is provided by a by-pass conduit 5. The by-pass conduit diverts gas away from the perforated wall 2 that would otherwise flow therethrough. The by-pass conduit is provided with a rotatable damper 6 or the like which is adapted during its rotation to raise and lower the pressure under the perforated bottom 2 repetitively and thereby to cause pulsation of the air through the product bed. The enclosure C (shown fragmentarily) provides a gas flow path by which substantially all of the air discharged from the container 1 and the conduit 5 passes through both the heat exchanger 4 and the flow through both fan 3 so that the fan 3 will constantly operate at full capacity and the heat exchanger 4 at full power.

The apparatus in combination with the rotatable damper 6 is provided with at least one adjustable passage 7 or the like controlling the amount of air flowing beside the container 1. The fan 3 or fans of the apparatus are dimensioned for heavy products which for their fluidization require a higher air velocity than that required for small and light products. This means that the amount of air in a product bed with light products must be reduced to prevent overblowing of the product. The reduction of the air amount thus required in the product bed is effected by means of the adjustable passage 7.

The passage 7 is, in accordance with the drawing, arranged in the conduit 5 with the rotatable damper 6. However, it might as well be situated beside the conduit 5. As is apparent from the drawing the size of passage 7 is controlled by at least one regulating damper 8 arranged in the conduit 5 with the rotatable damper 6.

The by-passage conduit 5 is so arranged relatively to the heat exchanger 4 that the total flow of air passes through the heat exchanger 4. The by-passage 5 will thus by-pass the container 1 only. The product bed in the container 1 will thus receive the proper amount of air while the heat exchanger 4 will always be used at a maximum.

According to the drawing the heat exchanger 4 is situated between the container 1 and the fan 3 as counted in the flow direction. However, the heat exchanger 4 might alternatively be situated after the fan 3 but before the container 1 while the conduit 5 would have to be situated between the heat exchanger 4 and the container 1 so that the total air flow also in this connection will pass through the heat exchanger 4.

The passage 7 can of course be adjusted with respect to the clogging which the heat exchanger, the evaporator, is exposed to during operation.

The invention is not restricted to that described above and shown in the drawing but can be modified within the scope of the appended claims.

What I claim and desire to secure by Letters Patent is:

1. Apparatus for treatment, such as freezing, of products such as food in the form of a bed of solid particles, said apparatus comprising a container having a perforated bottom for the product bed and through which gas is adapted to flow to the product bed in a direction generally upward and at a velocity sufficient to fluidize the product bed, said apparatus including at least one fan for causing gas to flow beneath said container and through the product bed via said perforated bottom and including a heat exchanger and a by-pass conduit, said by-pass conduit being positioned to divert gas from beneath said perforated bottom that would otherwise flow therethrough, said bypass conduit being provided with damper means which operates repetitively to raise and lower the gas pressure beneath the perforated bottom to cause the gas through the product bed to pulsate, said fan said heat exchanger being positioned relative to said container and said by-pass conduit in flow passage means for causing substantially all the gas flowing through each of said container and said conduit to pass through both said heat exchanger and said fan.

2. Apparatus as claimed in claim 1, wherein the damper means is rotatable.

3. Apparatus as claimed in claim 1, further comprising means for controlling the amount of gas that flows through said by-pass conduit.

4. Apparatus as claimed in claim 3, wherein said controlling means comprises means providing an adjustable passage through said by-pass conduit.

5. Apparatus as claimed in claim 3, wherein said controlling means comprises at least one regulating damper arranged in said conduit.

6. Apparatus for the treatment of food products and the like in the form of a bed of solid particles, comprising a container for said bed of particles having a perforated bottom through which gas is adapted to flow to the product bed in a direction generally upward and at a velocity sufficient to fluidize the product bed, a duct beneath said perforated bottom having an inlet, having first outlet means constituted by the perforated bottom of the container, and having second outlet means for diverting gas flowing in the duct away from the first outlet means, blower means for causing gas to flow through said duct from said inlet to said first and second outlet means, means associated with said second outlet means for repetitively varying the gas flow therethrough to cause repetitive gas pressure changes in said duct and thereby to cause the gas flow through said container to pulsate, a heat exchanger, and means defining a gas flow path from said container and said second outlet means to cause substantially all the gas discharged from each of said container and said outlet means to flow through both said heat exchanger and said blower means.

7. Apparatus in accordance with claim 6, wherein said second outlet means comprises a by-pass conduit and wherein said means for repetitively varying the gas flow through said second outlet means comprises repetitively operated damper means in said by-pass conduit.

8. Apparatus in accordance with claim 7, further comprising additional means for controlling the effective size of said second outlet means.

* * * * *